United States Patent
Li et al.

(10) Patent No.: US 10,255,064 B2
(45) Date of Patent: Apr. 9, 2019

(54) UPGRADE ANALYSIS OF A COMPUTER SYSTEM

(71) Applicant: VMware, Inc., Palo Alto, CA (US)

(72) Inventors: Hui Li, Fremont, CA (US); Michael Toback, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 20 days.

(21) Appl. No.: 15/400,764

(22) Filed: Jan. 6, 2017

(65) Prior Publication Data
US 2017/0371650 A1 Dec. 28, 2017

Related U.S. Application Data

(60) Provisional application No. 62/354,514, filed on Jun. 24, 2016.

(51) Int. Cl.
G06F 9/44 (2018.01)
G06F 8/71 (2018.01)
G06F 8/73 (2018.01)
G06F 8/65 (2018.01)

(52) U.S. Cl.
CPC .............. G06F 8/71 (2013.01); G06F 8/65 (2013.01); G06F 8/73 (2013.01)

(58) Field of Classification Search
CPC ............... G06F 8/71; G06F 8/65; G06F 8/73
USPC ........................................................ 717/122
See application file for complete search history.

(56) References Cited

U.S. PATENT DOCUMENTS

| | | | |
|---|---|---|---|
| 7,478,385 B2 | 1/2009 | Sierer et al. | |
| 7,979,898 B2 | 7/2011 | Zarenin et al. | |
| 8,286,132 B2 | 10/2012 | Yuan et al. | |
| 8,918,775 B1 | 12/2014 | Carpenter et al. | |
| 9,208,056 B1 | 12/2015 | Henriksen et al. | |
| 9,383,989 B1 * | 7/2016 | Qi | G06F 8/65 |
| 9,690,564 B2 * | 6/2017 | Bhat | G06F 8/65 |
| 9,891,907 B2 * | 2/2018 | Searle | H04L 41/082 |
| 2003/0200350 A1 * | 10/2003 | Kumar | G06F 8/71 719/315 |
| 2004/0060044 A1 * | 3/2004 | Das | G06F 8/65 717/171 |
| 2005/0044530 A1 * | 2/2005 | Novik | G06F 17/30174 717/122 |
| 2006/0136904 A1 | 6/2006 | Weidman et al. | |
| 2007/0261048 A1 | 11/2007 | Bernabeu-Auban et al. | |

(Continued)

OTHER PUBLICATIONS

Kleyman, "Understanding Hyperconverged Infrastructure Use Cases, datacenterknowledge.com website (Full URL in ref.)", May 5, 2016, 5 pgs.

*Primary Examiner* — Chameli Das

(57) ABSTRACT

In a computer-implemented method for performing an upgrade analysis of a computer system, a version dependency compatibility acyclic graph defining component dependency and component version interoperability for a plurality of installed components of the computer system is accessed. Upgradable components of the installed components are determined based on the version dependency compatibility acyclic graph. An upgrade analysis request for an upgradable component of the plurality of installed components is received. Installed components of the plurality of installed components that are impacted by an upgrade of the upgradable component are determined based on the version dependency compatibility acyclic graph.

16 Claims, 12 Drawing Sheets

(56) References Cited

U.S. PATENT DOCUMENTS

| | | | |
|---|---|---|---|
| 2008/0196024 A1 | 8/2008 | Barfield et al. | |
| 2013/0055247 A1* | 2/2013 | Hiltgen | G06F 8/60 718/1 |
| 2015/0142728 A1* | 5/2015 | Nigam | G06F 17/30289 707/609 |
| 2015/0180714 A1* | 6/2015 | Chunn | H04L 67/1097 709/221 |
| 2015/0312104 A1* | 10/2015 | Riewrangboonya | G06F 9/45558 709/224 |
| 2015/0379061 A1* | 12/2015 | Paraschivescu | G06F 17/30551 707/695 |
| 2018/0005186 A1* | 1/2018 | Hunn | G06Q 10/10 |
| 2018/0039399 A1* | 2/2018 | Kaltegaertner | G06F 3/04842 |

* cited by examiner

700

```
┌─────────────────────────────────────────────────────────────────┐
│ RECEIVE SITE DATA IDENTIFYING THE INSTALLED COMPONENTS OF THE   │
│ COMPUTER SYSTEM AND A VERSION OF EACH OF THE INSTALLED          │
│ COMPONENTS.                                                     │
│ 710                                                             │
└─────────────────────────────────────────────────────────────────┘
                                 │
                                 ▼
┌─────────────────────────────────────────────────────────────────┐
│ RECEIVE COMPONENT DEPENDENCY DATA IDENTIFYING AT LEAST ONE      │
│ COMPONENT OF THE INSTALLED COMPONENTS REQUIRING INSTALLATION OF │
│ ANOTHER COMPONENT OF THE INSTALLED COMPONENTS.                  │
│ 720                                                             │
└─────────────────────────────────────────────────────────────────┘
                                 │
                                 ▼
┌─────────────────────────────────────────────────────────────────┐
│ RECEIVE COMPONENT INTEROPERABILITY DATA IDENTIFYING VERSIONS OF A│
│ COMPONENT OF THE INSTALLED COMPONENTS THAT ARE INTEROPERABLE    │
│ WITH VERSIONS OF ANOTHER COMPONENT OF THE INSTALLED COMPONENTS. │
│ 730                                                             │
└─────────────────────────────────────────────────────────────────┘
                                 │
                                 ▼
┌─────────────────────────────────────────────────────────────────┐
│ GENERATE A VERSION DEPENDENCY COMPATIBILITY ACYCLIC GRAPH BASED │
│ AT LEAST ON THE INSTALLED COMPONENTS, THE COMPONENT DEPENDENCY  │
│ DATA AND COMPONENT INTEROPERABILITY DATA.                       │
│ 740                                                             │
└─────────────────────────────────────────────────────────────────┘
                                 │
                                 ▼
┌─────────────────────────────────────────────────────────────────┐
│ DETERMINE WHETHER THE INSTALLED COMPONENTS ARE INTEROPERABLE    │
│ BASED ON THE VERSION DEPENDENCY COMPATIBILITY ACYCLIC GRAPH.    │
│ 750                                                             │
└─────────────────────────────────────────────────────────────────┘
                                 │
                                 ▼
                                (A)
```

```
┌─────────────────────────────────────────────────────────────┐
│ DETERMINE WHETHER PAIRS OF INSTALLED COMPONENTS ARE         │
│ INTEROPERABLE, WHEREIN A FIRST INSTALLED COMPONENT OF A PAIR IS │
│ DEPENDENT ON A SECOND INSTALLED COMPONENT OF THE PAIR.      │
│                          752                                 │
└─────────────────────────────────────────────────────────────┘
                              ┆
                              ▼
┌─────────────────────────────────────────────────────────────┐
│ PROVIDED A FIRST PLURALITY OF INSTALLED COMPONENTS ARE      │
│ DEPENDENT ON A FIRST INSTALLED COMPONENT, DETERMINE WHETHER │
│ EACH PAIR OF THE FIRST PLURALITY OF INSTALLED COMPONENTS AND│
│ THE FIRST INSTALLED COMPONENT ARE INTEROPERABLE.            │
│                          754                                 │
└─────────────────────────────────────────────────────────────┘
                              │
                              ▼
┌─────────────────────────────────────────────────────────────┐
│ PROVIDED A SECOND PLURALITY OF INSTALLED COMPONENTS ARE     │
│ ANCESTORS TO A SECOND INSTALLED COMPONENT, DETERMINE        │
│ WHETHER EACH PAIR OF THE SECOND PLURALITY OF INSTALLED      │
│ COMPONENTS AND THE SECOND INSTALLED COMPONENT ARE           │
│ INTEROPERABLE.                                              │
│                          756                                 │
└─────────────────────────────────────────────────────────────┘
```

ACCESS A VERSION DEPENDENCY COMPATIBILITY ACYCLIC GRAPH DEFINING COMPONENT DEPENDENCY AND COMPONENT VERSION INTEROPERABILITY FOR A PLURALITY OF INSTALLED COMPONENTS OF THE COMPUTER SYSTEM.
810

DETERMINE AT LEAST ONE UPGRADABLE COMPONENT OF THE PLURALITY OF INSTALLED COMPONENTS BASED ON THE VERSION DEPENDENCY COMPATIBILITY ACYCLIC GRAPH.
820

IDENTIFY AN INSTALLED COMPONENT HAVING AN UPGRADABLE VERSION AS AN INTERSECTION SET OF THE COMPATIBILITY VERSION SET FOR THE NODE REPRESENTING THE INSTALLED COMPONENT OTHER THAN A CURRENT VERSION OF THE INSTALLED COMPONENT.
822

PROVIDED THE INTERSECTION SET IS NOT NULL, DETERMINE THE INSTALLED COMPONENT IS AN UPGRADABLE COMPONENT.
824

RECEIVE AN UPGRADE ANALYSIS REQUEST FOR AN UPGRADABLE COMPONENT OF THE PLURALITY OF INSTALLED COMPONENTS.
830

IDENTIFY INSTALLED COMPONENTS OF THE PLURALITY OF INSTALLED COMPONENTS THAT ARE IMPACTED BY AN UPGRADE OF THE UPGRADABLE COMPONENT BASED ON THE VERSION DEPENDENCY COMPATIBILITY ACYCLIC GRAPH.
840

RECURSIVELY TRAVERSE THE VERSION DEPENDENCY COMPATIBILITY ACYCLIC GRAPH STARTING FROM THE UPGRADABLE COMPONENT TO DETERMINE IMPACTED INSTALLED COMPONENTS.
842

IDENTIFY A COMPATIBLE VERSION SET FOR EACH OF THE IMPACTED INSTALLED COMPONENTS.
844

UPGRADE ANALYSIS OF A COMPUTER SYSTEM

RELATED APPLICATIONS

This application claims priority to and the benefit of U.S. Patent Provisional Patent Application 62/354,514, filed on Jun. 24, 2016, entitled "UPGRADE ANALYSIS OF A COMPUTER SYSTEM," by Hui Li, and assigned to the assignee of the present application, which is incorporated herein by reference in its entirety.

BACKGROUND

Computer systems typically include a number of installed components, such as software applications, operating systems, hardware and firmware. As the size of a computer system grows, for example a network-based distributed computer system, or a hyper-converged appliance, the number of installed components also usually grows. Furthermore, as the number of installed components grows, the version interdependencies among these components will become increasingly complex. In order to ensure that an installation of components operates properly, it is important to ensure that any issues regarding the interoperability of the installed components are considered and addressed.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 7A-7C illustrate flow diagrams of an example method for validating interoperability of installed components of a computer system, according to various embodiments.

FIGS. 8A & 8B illustrate flow diagrams of an example method for performing an upgrade analysis of a computer system, according to various embodiments.

DESCRIPTION OF EMBODIMENTS

Figure 1:
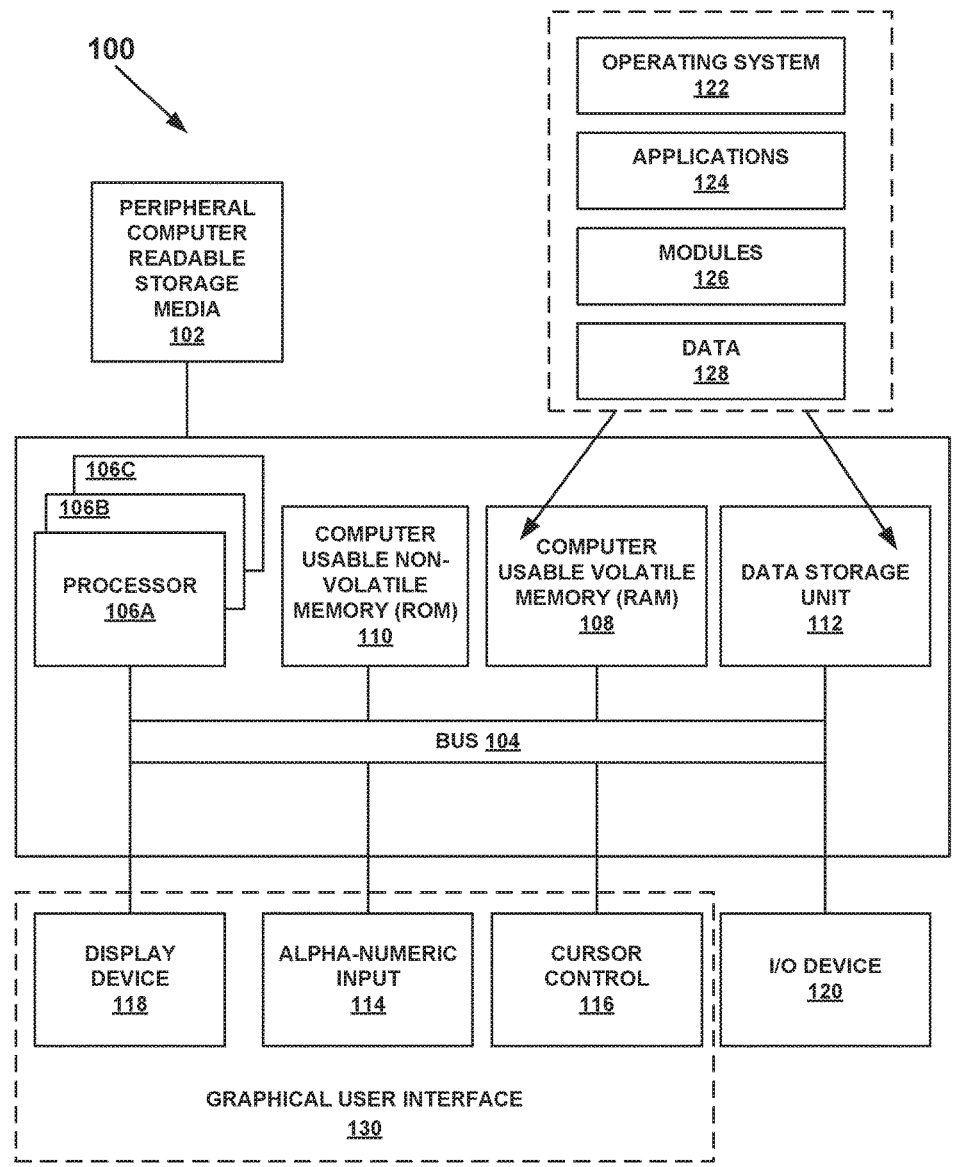
FIG. 1 shows an example computer system upon which embodiments of the present invention can be implemented.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

NOTATION AND NOMENCLATURE

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "validating," "receiving," "identifying," "determining," "generating," "connecting," "storing," "updating," "presenting," "accessing," "traversing," "converting," "comparing," "matching," or the like, refer to the actions and processes of an electronic computing device or system such as: a host processor, a processor, a memory, a hyper-converged appliance, a virtual storage area network (VSAN), a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

OVERVIEW OF DISCUSSION

Example embodiments described herein improve the performance of computer systems by improving the compatibility of components and facilitating upgrading of the components to ensure compatibility.

In one embodiment, a computer-implemented method for validating interoperability of installed components of a computer system is provided. Site data identifying the installed components of the computer system and a version of each of the installed components is received, component dependency data identifying one component of the installed components requiring installation of at least another component of the installed components is received and component interoperability data identifying versions of a component of the installed components that are interoperable with versions of another component of potentially installable components is received. A version dependency compatibility acyclic graph is generated based at least on the installed components, the component dependency data and component interoperability data. It is determined whether the installed components are interoperable based on the version dependency compatibility acyclic graph.

In one embodiment, a computer-implemented method for performing an upgrade analysis of a computer system is provided. A version dependency compatibility acyclic graph defining component dependency and component version interoperability for a plurality of installed components of the computer system is accessed. Upgradable components of the installed components are determined based on the version dependency compatibility acyclic graph. An upgrade analysis request for an upgradable component of the plurality of installed components is received. Installed components of the plurality of installed components that are impacted by an upgrade of the upgradable component are determined based on the version dependency compatibility acyclic graph. A component is upgradable to an upgraded version if there exists for each required component a version compatible with the upgraded version of that component.

As computer systems with networked components continue to expand (e.g., expanding horizontally to embrace new components and vertically to support various hardware stacks), the version interdependencies among these components and layers are becoming increasingly complex. A customer often has no visibility into these interdependencies, making management and effectuation of partial updates or upgrades (e.g., single hosts, storage array firmware) difficult without encountering version incompatible situations.

For example, a typical problem with complex systems arises when a system administrator wants to perform an upgrade of a specific component and wants to know what other components may be affected. To manually determine what other components might be effected is difficult and error prone. Another problem is where a system administrator wants to know what components can be upgraded and in doing so what the risks are to the overall system. In this context, risk can mean whether or not the system can be run while the upgrade is happening, or if not, whether a restart or reboot is required. Installing incompatible versions of components can result in catastrophic failures or random errors, and in neither situation would it be readily apparent that there is a cause-effect relationship due to the installation of incompatible versions of software. Accordingly, embodiments described herein provide for version compatibility management that facilitates the identification of a valid version path for performing upgrades.

Embodiments described herein provide a version compatibility validation for any system whose component level interdependency and interoperability are available. Various embodiments provide a systematic algorithm that constructs and searches an acyclic graph augmented with many-to-many version compatibility constraints. In various embodiments, a list of potential upgradable components is presented enabling searches for valid upgrade paths upon an upgrade of a specific component with a target version. Such information should serve as a valuable reference for customers to make a well-rounded upgrade plan.

The following terms are utilized throughout the application in accordance with the description of the various embodiments. It should be understood that the definitions are not meant to be limiting, and that other definitions consistent with the state of the art may also be used herein.

Site: An installation including one or more components of particular versions which have known interoperabilities. These components may be software programs or applications, operating systems, hardware, firmware, etc.

Component: A deliverable item that may be a software program or application, an operating system, hardware, firmware, etc. Normally this is a product but it could be an entity within or used by a product component (e.g., a plugin). An installable instance of a component is described by at least a name and a version identifier, such that it can be determined from the version identifier that an installable instance of a component is newer than another.

Upgraded Component: A component version which is higher than the currently installed component.

Interoperability: A version of a component is said to interoperate with a version of another component if the component versions are able to operate together without causing one or both to operate improperly. For example, versions of components are said to interoperate if either or both companies or vendors which distribute the components certify such interoperability. This might mean that the components can be used together in an installation, although a company may document specific issues with doing such.

Dependency: A component is said to depend on another component if the installation of the component requires the other component be installed. For instance, VMware's vCenter Server 6.0 requires that a version of VMware's ESXi be installed for it to run properly, but ESXi does not require the installation of vCenter Server 6.0. Therefore, ESXi is the dependent component.

Ancestor: A component is said to be an ancestor of one or more components in an acyclic graph if it has the dependency upon those components. In the example above, vCenter Server is an ancestor of ESXi.

Required Upgrade: An upgrade is said to be required if there is no interoperability existing between a newly upgraded dependent component and its ancestor component or vice versa.

Recommended Upgrade: An upgrade is said to be recommended if there is interoperability existing between a newly upgraded component and current versions of its dependent or ancestor components, but there is also an interoperability existing with a newer version. In such case, it is recommended to upgrade its dependent or ancestor component version.

Hyper-Converged Appliance (HCA): A hyper-converged appliance (HCA) is a type of infrastructure system with a software-centric architecture that tightly integrates computational, storage, networking and virtualization resources and other technologies in a commodity hardware box, typically supported by a single vendor. A hyper-converged system allows the integrated technologies to be managed as a single system through a common toolset. Hyper-converged systems may be expanded through the addition of nodes to the base unit. Common use cases include virtualized workloads to control the hyper-converged appliance. For example, a Linux Container™ (LXC™) is a workload that has operating system-level capabilities which make it possible to run multiple isolated Linux™ systems or containers, on one control host (the LXC™ host). LAC™ serves as a lightweight alternative to full machine virtualization via hypervisors like KVM™, VMware's ESXi™ or Xen™.

Client: A client is a person or organization using the component and/or services of another professional person or company.

Site Metadata: A serialized storable data representation of the interoperability between components.

Build Metadata: In one or more embodiments, the component can include a file as part of its build that lists all of the components the component depends on. This information can then be used to analyze potential upgrades and interoperability as described further in this document.

Upgrade Path: A set of upgrades which must or can be performed in order to upgrade a given component. For instance, if a component is dependent on one or more components which in turn are dependent on other components, and there is a set of versions of all of these components that allow for an upgrade of one component but require the upgrade of more than one component, there is an order that these upgrades must be performed in because of the dependencies.

Example Computer System Environment

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, hand-held computer systems, multi-media devices, hyper-converged appliances, virtual machines, virtualization management servers, and the like. Computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 1066, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g., random access memory (RAM), coupled with bus 104 for storing information and instructions for processors 106A, 106B, and 106C. System 100 also includes computer usable non-volatile memory 110, e.g., read only memory (ROM), coupled with bus 104 for storing static information and instructions for processors 106A, 106B, and 106C. Also present in system 100 is a data storage unit 112 (e.g., a magnetic or optical disc and disc drive) coupled with bus 104 for storing information and instructions. System 100 also includes an alphanumeric input device 114 including alphanumeric and function keys coupled with bus 104 for communicating information and command selections to processor 106A or processors 106A, 106B, and 106C. System 100 also includes an cursor control device 116 coupled with bus 104 for communicating user input information and command selections to processor 106A or processors 106A, 106B, and 106C. In one embodiment, system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with system 100 through graphical representations presented on display device 118 by interacting with alphanumeric input device 114 and/or cursor control device 116.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Example Version Compatibility Validator Including a Version Dependency Compatibility Acyclic Graph Example embodiments described herein provide systems and methods for validating interoperability of installed components of a computer system and for upgrade analysis of a computer system. Embodiments described herein provide a version compatibility validation for any system whose component level interdependency and interoperability are available. Various embodiments provide a systematic algorithm that constructs and searches an acyclic graph augmented with many-to-many version compatibility constraints. In various embodiments, a list of potential upgradable components is presented enabling searches for valid upgrade paths upon an upgrade of a specific component with a target version.

Figure 2:
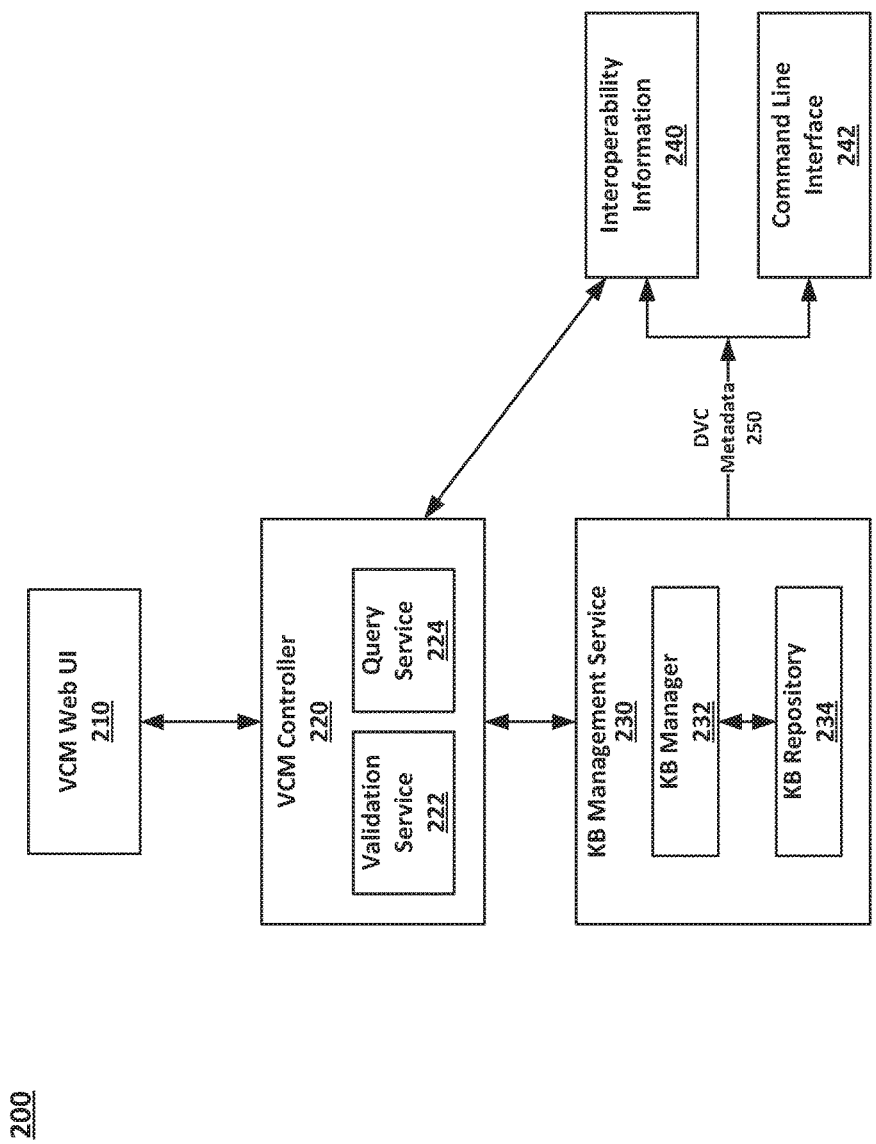
FIG. 2 shows an example version compatibility validator, in accordance with various embodiments.

FIG. 2 shows an example version compatibility validator 200, in accordance with various embodiments. Version compatibility management (VCM) controller 220 is the central module that provides core services for customers to perform validation and query. Validation service 222 offers version compatibility check upon a specified list of components to be upgraded along with their targeted versions. Query service 224 answers the inquiry about a list of components that have new versions available at downloadable site or what are all the components to be impacted if a particular component is to be upgraded. In one embodiment, VCM Controller 220 is installed as a single instance per customer site. In other embodiments, it can be installed one instance per appliance or per node. This module implements the validation and query logic based on a component dependency graph grafted with version compatibility information, also referred to herein as a version dependency compatibility acyclic graph.

In various embodiments, version compatibility validator 200 includes a web-based user interface (UI), referred to herein as VCM UI 210 for system administrators to submit validation and query requests.

Version compatibility validator 200 also includes knowledge base (KB) management service layer 230 for maintaining component dependency information along with version compatibility information. KB management service layer 230 includes KB manager 232 and KB repository 234. KB management service layer 230 provides two interfaces:

VCM controller interface—remotely consumed by VCM controller 220 in response to received validation or query requests, e.g., submitted by system administrators. In accordance with various embodiments, the validation or query requests are received via VCM UI 210. For example, the VCM controller interface can be implemented using a representational state transfer (REST) application program interface (API).

KB repository input interface—populating the component dependency information and version compatibility data into KB repository 234. In one embodiment the KB repository input interface provides two channels: a command line interface (CLI) command interface 242 for receiving input and an interoperability information connector 240 that retrieves input from a database that maintains the interoperability information for components. In one or more embodiments, the database is contained in the KB repository 234. It should be appreciated that the interoperability information may be provided by a vendor, a customer, or another party, and is independent of any specific site or installation.

To unify the outgoing and incoming data exchange of KB management service layer 230 through the above two interfaces, dependency version compatibility (DVC) metadata 250 that captures component dependency and version compatibility information is utilized. In one embodiment, DVC metadata 250 is a serialized form of component dependency graph augmented with version compatibility data. In various embodiments, a DVC serializer and de-serializer may be used in both VCM controller 220 and KB manager 232 to do the conversion between metadata and such in-memory graph representation.

The DVC metadata 250 is used to describe the interdependency along with compatible current version information among all the components within the system, and provides a descriptive format that can be used to seed the initial state of the component dependency and compatible current versions within a system when the validator starts up, and also to feed any incremental change on such dependency into an up-running validator so that the validator can modify its in-memory data structure accordingly. In one embodiment, the DVC metadata 250 is in XML format. Each metadata content maps to a DVC graph instance. The following is an example of DVC metadata that corresponds to the DVC graph illustrated in FIG. 3.

```
<?xml version="1.0" encoding="UTF-8"?>
<dvc>
    <componentType>
        <name>VCSA</name>
        <currentVersion>6.0.0</currentVersion>
        <dependentComponentType>
            <name>ESXi</name>
<compatibleVersion>6.0.0<compatibleVersion>
        </dependentComponentType>
    </componentType>
    <componentType>
        <name>LogInsight</name>
        <currentVersion>3.0</currentVersion>
        <dependentComponentType>
            <name>VCSA</name>
<compatibleVersion>6.0.0<compatibleVersion>
        </dependentComponentType>
        <dependentComponentType>
            <name>ESXi</name>
<compatibleVersion>6.0.0<compatibleVersion>
        </dependentComponentType>
    </componentType>
    <componentType>
        <name>NSX</name>
        <currentVersion>6.2</currentVersion>
        <dependentComponentType>
            <name>VCSA</name>
<compatibleVersion>6.0.0<compatibleVersion>
        </dependentComponentType>
        <dependentComponentType>
            <name>ESXi</name>
<compatibleVersion>6.0.0<compatibleVersion>
        </dependentComponentType>
        <dependentComponentType>
            <name>LogInsight</name>
<compatibleVersion>3.0<compatibleVersion>
        </dependentComponentType>
    </componentType>
    <componentType>
        <name>ESXi</name>
        <currentVersion>6.0.0</currentVersion>
    <componentType>
<dvc>
```

In embodiments, VCM Controller 220 accepts site information through VCM web UI 210, and validates the site information and converts it to a version dependency compatibility acyclic graph using the user provided list and the interoperability and dependency data from KB repository 234.

In one or more embodiments, a DVC graph construction is based on the parsing of an input of DVC metadata in XML format. Each componentType tag maps to a DVC node in the graph. Within each componentType tag, each dependentComponentType tag also maps to a DVC node and a directed edge will be created to connect from componentType DVC node to dependentComponentType DVC node. To ensure all componentType tags with the same name map to a same DVC node, in one or more embodiments a DVC node cache is used by each DVC graph to store the mapping between a node name which is also the name of the componentType tag and its corresponding DVC node object.

Each version compatibility validator instance maintains a single master instance of DVC graph to capture the interdependency and version compatibility information of the entire system. In various embodiments, whenever a system's components are changed due to adding or removing of components, the master DVC graph is adjusted accordingly. The master DVC graph is constructed in two phases. The first phase is the creation of graph instance based on a seeded DVC metadata that describes the inter-dependency along with compatible current versions of all the components within the system. Once the graph is created, all update-to-date compatible version information of each directed edge is populated based on the inter-operability information retrieved from an external data source.

Figure 3:
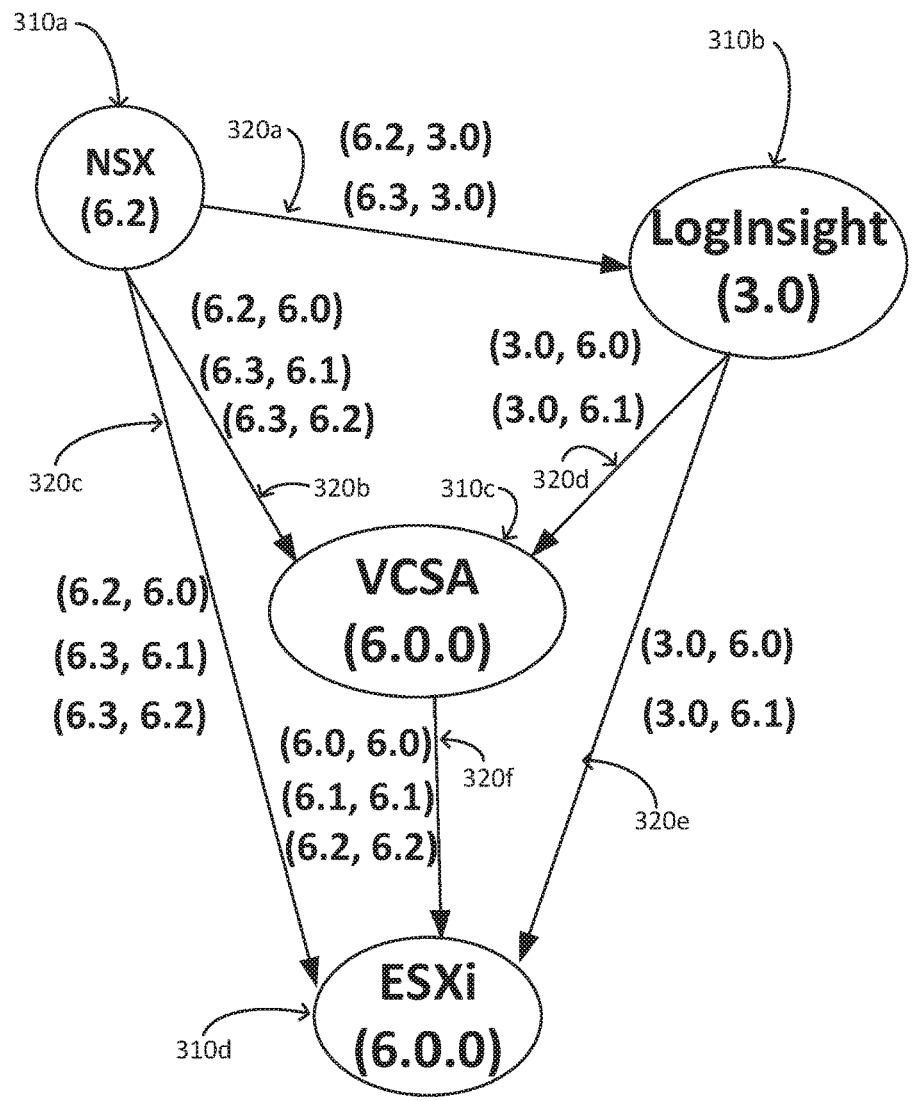
FIG. 3 shows an example version dependency compatibility acyclic graph, in accordance with an embodiment.

To facilitate identifying a legal path for upgrading components based on the constraints from component dependency and version compatibility information, DVC graph data structure, also referred to herein as a version dependency compatibility acyclic graph is introduced. FIG. 3 shows an example version dependency compatibility acyclic graph 300, in accordance with an embodiment. Each node 310a-d, also referred to herein as a DVC node, represents a component in a deployed system. Each component node 310a-d stores the current version installed in a system. Directed edges 320a-f, also referred to herein as a "DVC edge," each connect two components. For each directed edge 320a-f, the source end component has the dependency upon the destination end component. As utilized herein, the source end component is referred to as the ancestor component while the destination end component is referred to as dependent component. As illustrated, the node at the head of the arrow represents the dependent component, while the node at the tail end of the arrow represents the ancestor component.

The version compatibility dependency acyclic graph 300 also includes at least one version compatibility information pair associated with each directed edge 320a-f. A version compatibility information pair identifies version compatibility between a pair of nodes 310a-d connected by a particular directed edge 320a-f. As illustrated, the items in parenthesis on each edge represents the interoperabilities between the components, where the first number represents the version of the ancestor node and the second number represents the version of the dependent node. The interoperabilities represent that of the current state and any potential upgrades. For example, if the list of interoperabilities does not include the versions associated with the pair of nodes, then that implies that there is no interoperability between the nodes and an upgrade should be considered or analyzed to reduce risk of failure.

In one embodiment, a version compatibility information pair includes a tuple of values enclosed by a parenthesis as shown in FIG. 3, where the first value represents the version number of the ancestor component and the second value represents the version number of the dependent component. It should be appreciated that a particular component could be associated with multiple version compatibility information pairs. In accordance with various embodiments, a version compatibility dependency acyclic graph 300 only maintains those version compatibility information pairs that contain the version number of that component larger than or equal to its current version number. In other words, in the present embodiment, the version dependency compatibility acyclic graph 300 does not support component downgrading.

As an example shown in FIG. 3, NSX component (node 310a) depends on VCSA component (node 310b), as indicated by directed edge 320a, and VCSA component (node 310b) further depends on ESXi component (node 310c), as indicated by directed edge 320e. Between NSX and VCSA, NSX 6.2 is compatible with VCSA 6.0 and NSX 6.3 is compatible with VCSA 6.1, as indicated by the version compatibility information pairs associated with directed edge 320b. Because NSX component's current version is 6.2, the version dependency compatibility acyclic graph 300 does not maintain any version compatibility information pair that has NSX version number lower than 6.2.

With reference to FIG. 2, the query service 224 then compares the component version pairs provided with the interoperability data to determine if the dependent pairs interoperate. If the dependent pairs are interoperable, a successful message is returned to the user. If they do not, an indication that the pairs are not interoperable is returned to the user. In one embodiment, the pairs that do not interoperate are also returned to the user. In one embodiment, query service 224 also determines what upgrades are available.

To facilitate the illustration of how to detect all the upgradable components within a system, a term called "Compatibility Version Set" is introduced. A compatibility version set is specific to a DVC node and a DVC edge associated with that node. For each DVC edge of a node, a compatibility version set is formed by collecting all the distinct versions of that node appearing in all associated compatible version information pairs. For example, for the DVC graph illustrated in FIG. 3, the compatibility version set of NSX node's outgoing edge with VCSA node is (6.2, 6.3). Regardless of an outgoing or incoming edge of a particular node, it should have a non-empty compatibility version set, at least containing the current version of that node.

The following code snippet shows an example of algorithm of detecting a system's upgradable components. The core logic is that for each DVC node, it generates compatibility version set for each associated edges (outgoing and incoming) and then get the intersection of those sets. The intersection set represents those common versions that appear across all version compatibility information pairs across all the edges.

```
DVCNode[ ] GetUpgradableNodes( ) {
    List<DVCNode> retNodes = new LinkedList<DBCNode>( );
    DVCNode[ ] allNodes = masterDVCGraph.getAllCachedNodes( );
    foreach (DVCNode curNode : allNodes) {
        Set<String> intersectSet = null;
        DVCEdge[ ] dependentEdges = curNode.getDependentEdges( );
        foreach (DVCEdge depEdge : dependentEdges) {
            if (intersectSet == null) {
                intersectSet = depEdge.getCompatabilityVersionSet(curNode));
            } else {
                intersectSet.retainAll(depEdge.getCompatabilityVersionSet(curNode));
            }
        }
        Repeat the above for all ancestor edges of curNode.
        if(!intersectSet.isEmpty( ) && intersect.hasVersions > node.getCurrentVersion( ) {
            node.setUpgradableVersion(intersectSet);
            retNodes.add(node);
        }
    }
}
```

Executing the code snippet provides the versions that are known to be a compatible version existing from all immediate dependent or ancestor nodes. Normally this version set also includes the current version of the node. So the upgradable versions of a DVC node will be all the versions within this intersection set except the current version of the node.

Within a system that has inter-dependent components, often upon an upgrade of one particular component, other components are impacted as well. Embodiments described herein determine the impacted components upon a request on upgrading a specific component node to one of its upgradable versions. Those impacted components may presented as one or multiple valid upgradable paths, which provide a clear picture on what exactly needs to be done besides knowing the list of impacted components.

In one embodiment, the algorithm encompasses two phases. The first phase is to recursively walkthrough the master DVC graph starting from the upgrade component. It is a depth-first walkthrough so that the output sequence of those visited nodes is consistent with the component dependency. In other words, those components being depended upon are listed prior to their ancestor components. At the end of the first phase, an impacted node candidate list is resolved.

Figure 9:
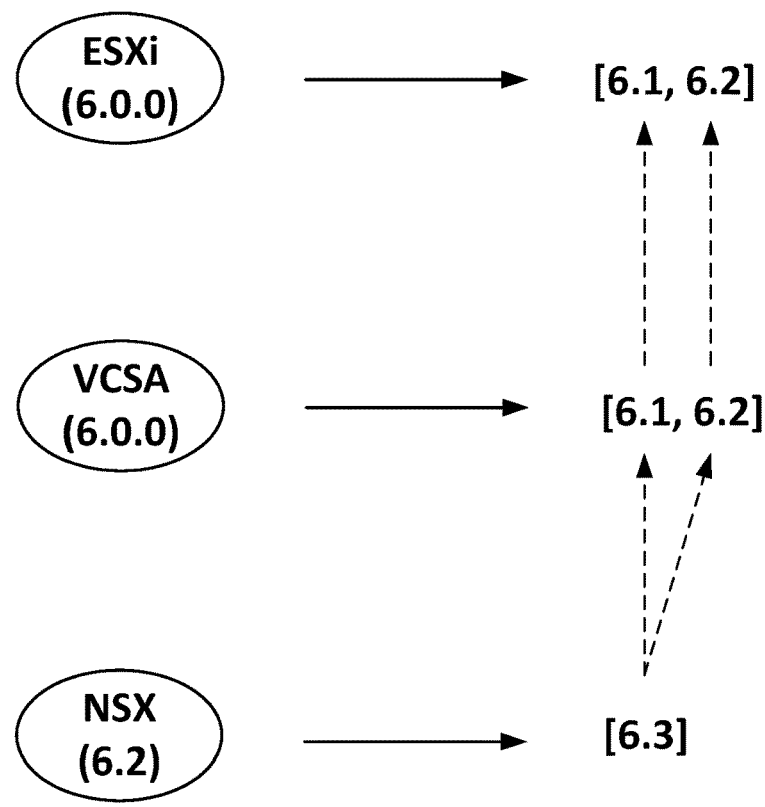
FIG. 9 shows a schematic illustration of an example impacted node candidate list, according to various embodiments.

The impacted node candidate list stores all potentially impacted nodes in the component dependency order. Moreover, for each node candidate, a compatible version set is also identified. Each version inside the compatible version set represents a version that is compatible with one or several ancestor nodes appearing in the impacted node candidate list. FIG. 9 illustrates a schematic illustration of an example impacted node candidate list 900. The example impacted node candidate list is based on the master DVC graph as shown in FIG. 3 and the target upgrade component is NSX with target upgrade version 6.3.

The second phase is to resolve the upgradable paths based on the impacted node candidate list. The algorithm starts from the top node candidate first and for each version inside its compatible version set, as long as it is not the same as the current version of the node, an upgradable path can be resolved starting from that node. The algorithm continues to iterate thru the compatible version set for the top node to resolve all upgradable paths starting from the top node. The algorithm then moves down to the next node candidate and continues resolving all upgradable paths starting from the next node. This is repeated for all node candidates until all node candidates are visited.

To resolve each upgradable path starting from a particular node, a separate walkthrough of the same impacted node candidate list is involved. The walkthrough starts from that particular node and for each already visited nodes—the version linked by the dashed arrow in FIG. 9. So for the impacted node candidate list example shown visited node candidate, selected such that it matches with the selected versions of those the corresponding version needs to be in FIG. 9, at the end of the second phase, two upgrade paths will be resolved to show the impact of upgrading NSX component from 6.2 to 6.3:

ESXi 6.1←VCSA 6.1←NSX 6.3
ESXi 6.2←VCSA 6.2←NSX 6.3

Returning to FIG. 2, in embodiments, KB repository 234 includes an entry for each known component version component interoperability and dependency links. In various embodiments, KB repository also includes a mapping of a complex component/version, such as a hyper-converged appliance (HCA), to a set of one or more component versions contained within the HCA and their dependencies.

In accordance with various embodiments, the KB management service layer 230 can be deployed as a cloud-based service to serve as a single source of truth about component inter-dependency and version compatibility among all the components configured and managed by computer systems across all customer sites. This deployment allows administrators manage the content upgrades and/or updates in a centralized manner.

Figure 4:
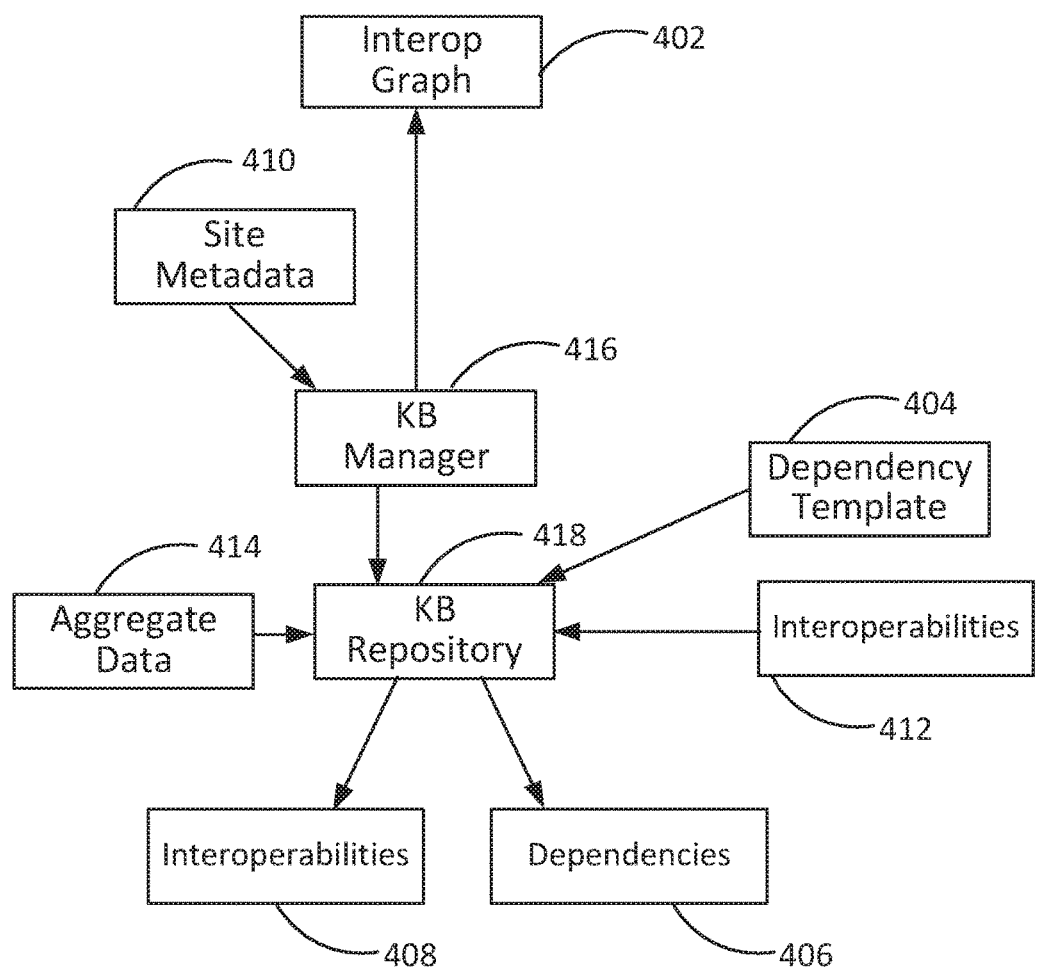
FIG. 4 shows an example knowledge base management service, in accordance with various embodiments.

FIG. 4 shows an example knowledgebase management service 230, in accordance with various embodiments. A communications channel between one or more external interoperability databases provides the interoperability pairs 412 maintained by the knowledgebase management service 230. The interoperabilities 408 are then stored in KB repository 418. In one embodiment, a dependency channel provides inputs as to the dependency relationships between components as a set of dependency templates 404, which is assumed to be independent of the component version. These are then stored as dependencies 406 in KB repository 418. An administrative channel provides inputs to define the more complex component relationships as described above, such as the relationship between an HCA and its subordinate components. The knowledgebase manager 416 accepts site metadata 410, then using the data stored in the knowledgebase repository 418 generates the version dependency compatibility acyclic graph 402. In another embodiment, site metadata 410 includes the dependent and aggregate component data.

In one embodiment, the interoperability data 408 is stored as a data structure containing a mapping of the component version information to one or more other component version that it interoperates with. The dependency data 406 can be stored as a mapping of an ancestor component with one or more dependent component. The aggregation data 414 representing a mapping of a component/version name to contained components can also be stored as a map in KB repository 418. This information is operable to build a network representation of the interoperable component versions and their dependencies for a specific site, based on a list of component versions that it uses.

Figure 5:
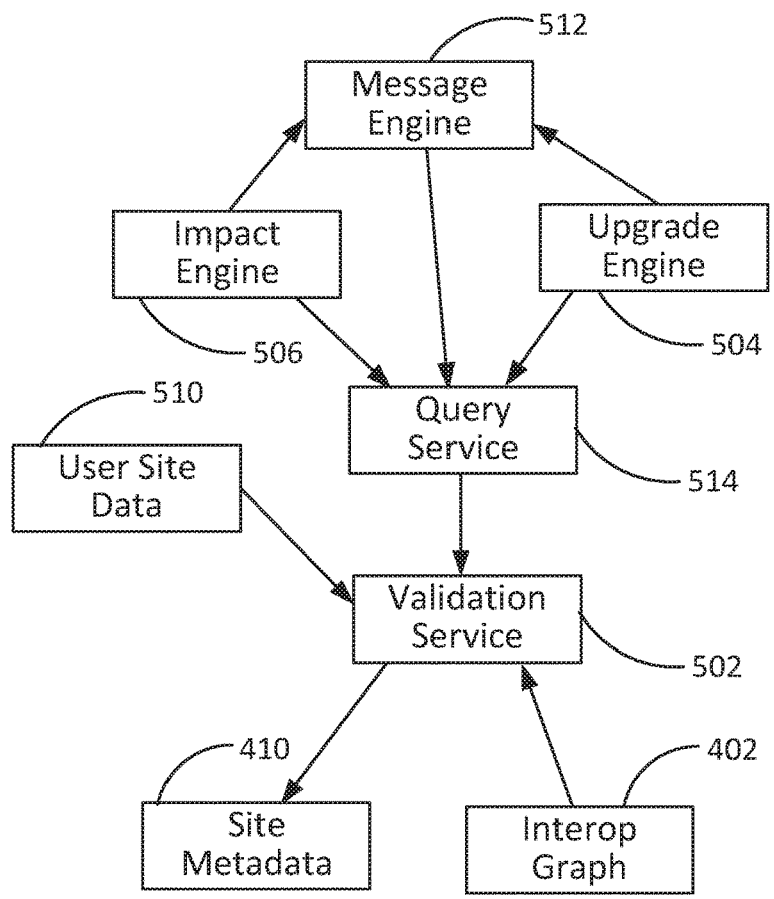
FIG. 5 shows an example version compatibility management (VCM) controller, in accordance with various embodiments.

FIG. 5 shows an example VCM controller 220, in accordance with various embodiments. The validation service 502 accepts user site data 510. The site data structure is validated, and then sent to KB repository 418 to be turned into a version dependency compatibility acyclic graph. In one or more embodiments, a version dependency compatibility acyclic graph is generated on request rather than stored in KB repository 418 for later processing via the query service 514. On request, the impact engine 506 accepts a component/version combination associated with an upgrade of a component/version in the site metadata 510. On request, the upgrade engine 504 analyzes the version dependency compatibility acyclic graph 402 and provides the list of possible upgrades.

In one or more embodiments, the site data structure is validated on two levels. First, the pairs of dependencies are validated by the validation service 502 to make sure they interoperate. Second, if more than one component is dependent on another component or an ancestor to one or more components, then the validation service 502 verifies that all of the component relationships allow each version to interoperate across all affected components.

In one or more embodiments, the impact engine 506 and upgrade engine 504 communicate with requestors via a message engine 512. In one or more embodiments, message engine 512 communicates with requestors using a standard protocol such as REST or SOAP, e.g., via VCM web UI 210.

Example Methods of Operation

Figure 6:
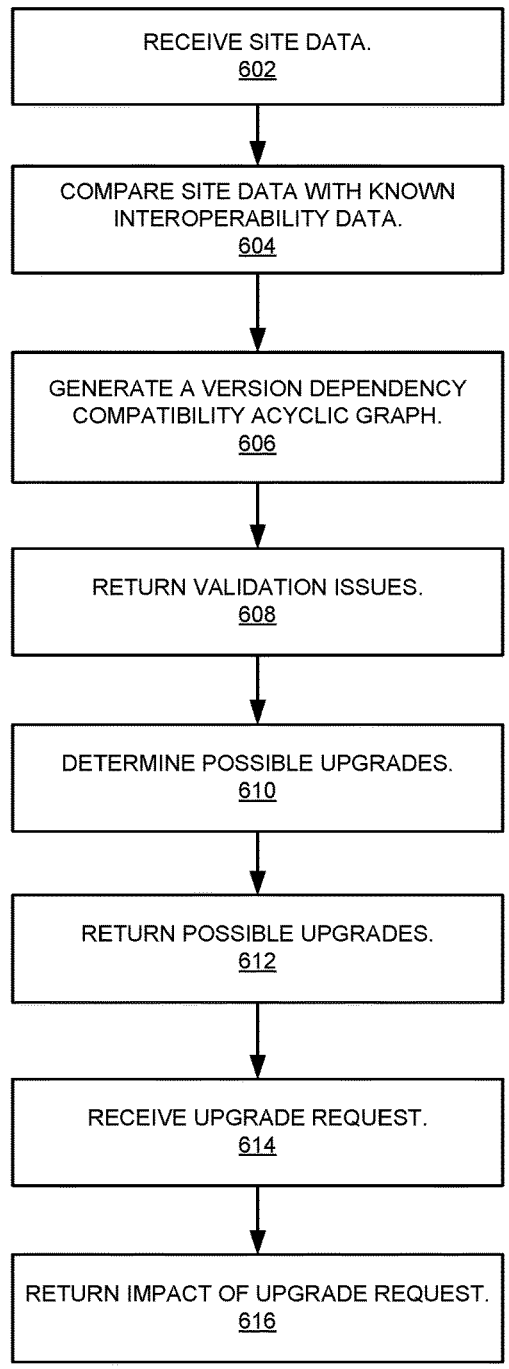
FIG. 6 shows an example method of operation of a version compatibility manager, in accordance with various embodiments.

FIG. 6 shows a flow diagram 600 of an example method of operation of a version compatibility manager, in accordance with various embodiments. Procedures of this method will be described with reference to elements and/or components of FIGS. 2, 4 and 5. It is appreciated that in some embodiments, the procedures may be performed in a different order than described, that some of the described procedures may not be performed, and/or that one or more additional procedures to those described may be performed. Flow diagram 600 includes some procedures that, in various embodiments, are carried out by one or more processors under the control of computer-readable and computer-executable instructions that are stored on non-transitory computer-readable storage media. It is further appreciated that one or more procedures described in flow diagram 600 may be implemented in hardware, or a combination of hardware with firmware and/or software With reference to FIG. 6, a flow diagram of flow diagram 600 for validating a set of components that are part of a site with known interoperabilities and dependencies will be presented. It is assumes that the apparatus has accepted the data that goes into the KB repository 234, the list of components/version pairs, their interoperability, and any aggregate data, has already been entered.

At procedure 602, the site data is received. In accordance with various embodiments, site data includes at least a list of all of the components installed on the site, including the component and version name. In one or more embodiments, it is assumed that the dependencies associated with the components are immutable and so are stored in the knowledgebase. In other embodiments, it is assumed that the site data will include dependency information.

At procedure 604, the site data is validated by comparing the site data with known interoperability information. At procedure 606, version dependency compatibility acyclic graph is generated. If the component/version information in the site data does not allow for interoperability, one or more validation issues may be returned to the requestor, as shown at procedure 608.

At procedure 610, once the version dependency compatibility acyclic graph is available, the query service 514 can accept requests to find possible upgrades via the upgrade engine 504. It should be appreciated that the version dependency compatibility acyclic graph may be newly generated or may a stored version dependency compatibility acyclic graph that was previously generated.

In one embodiment, possible upgrades are determined by first, for each graph node, associating a list of interoperable pairs, including an ancestor and dependency version such that there exists an intersection of common versions of each component at a version level higher than the current level. In other words, the pairs include a non-empty intersection of versions of a component. For instance, if component A depends on B and C, and both B and C are upgradable for one or more common versions of A greater than the current version of A, then A can be upgraded. Upgrade engine 504 reviews the generated version dependency compatibility acyclic graph to find all of the possible upgrades. Note that an upgrade is only possible if all of the components that interoperate with that component with the upgrade support the specific version. Referring to the example version dependency compatibility acyclic graph illustrated in FIG. 3, if NSX version 6.4 also interoperated with LogInsight and VCSA but not with ESXi, an upgrade to version 6.4 would not be possible.

At procedure 612, the possible upgrades are returned. In other embodiments, the list of possible upgrades includes a tag as to whether or not other work is required. In other embodiments, these tags could enable a user to know what other components will need to be upgraded without a separate request.

At procedure 614, a request to analyze a specific upgrade is received. In one or more embodiments, the impact engine 506 analyzes the impact of upgrading a specific component. In general, it is determined whether the specific upgrade will it cause other components to become un-interoperable, requiring other upgrades. If a component can be upgraded without requiring an upgrade to any other component, then it can be said to be upgradable without any other impacts. If a component can be upgraded only by upgrading one or more components to maintain interoperability, then it is said that the component can be upgraded but there are impacts. If there are no interoperable dependent components compatible with and upgradable component, then there is no upgrade path for that component.

In one or more embodiments, the analysis of a specific upgrade is as follows. Starting from the target component to be upgraded to a target version, a depth-first search is used to navigate the version dependency compatibility acyclic graph until all of the dependent nodes have been visited. For each dependent node, the target version is used to verify that the upgrade can be performed and identify if there is any interoperable pairs that match with it, and find the minimum possible upgrade. If it is interoperable with the current version, the analysis of that dependent node is complete. If it requires an upgrade to a dependent component, the analysis continues the depth-first search until either the search is completed or the currently searched component's version is interoperable with its ancestor. At each level, there needs to be a valid path for the ancestor's upgrade for all its dependencies. For example, refer to version dependency compatibility acyclic graph 300 of FIG. 3. If an upgrade request was received to upgrade NSX to version 6.3, this would be supported from NSX to ESXi. Going from NSX to VCSA, such an upgrade is also supported, but it would require an upgrade of VCSA to version 6.1, requiring analysis of the path from VCSA to ESXi. However, going from NSX to LogInsight, NSX version 6.3 is supported using the current version, so there is no reason to examine the LogInsight to ESXi path. The end result is that there is a path from ESXi, then LogInsight and VCSA, finally NSX.

At procedure 616, the impacts of the upgrade request are returned to the requestor.

Figure 7C:
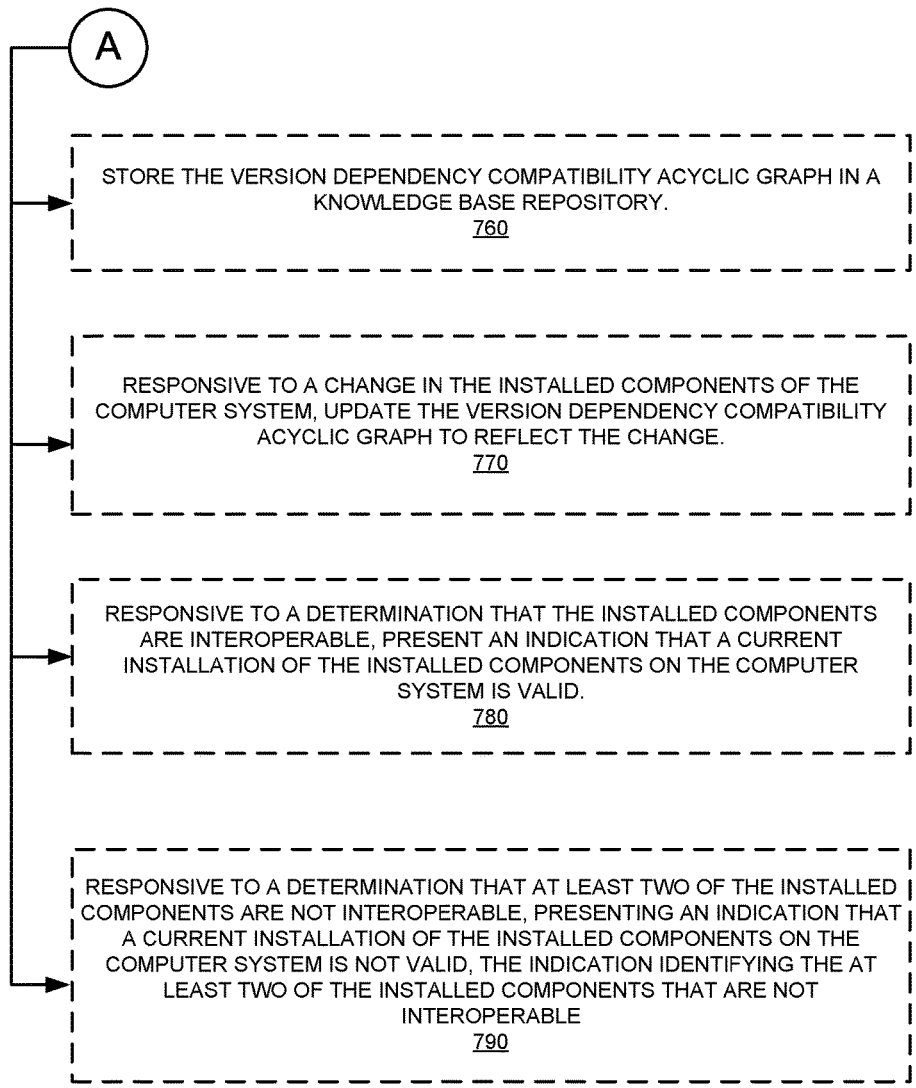

FIGS. 7A-C illustrate flow diagrams 700 of an example method for validating interoperability of installed components of a computer system, according to various embodiments. Procedures of this method may be described with reference to or implemented by elements and/or components of FIGS. 2 through 5. It is appreciated that in some embodiments, the procedures may be performed in a different order than described, that some of the described procedures may not be performed, and/or that one or more additional procedures to those described may be performed. Flow diagram 700 includes some procedures that, in various embodiments, are carried out by one or more processors under the control of computer-readable and computer-executable instructions that are stored on non-transitory computer-readable storage media. It is further appreciated that one or more procedures described in flow diagram 700 may be implemented in hardware, or a combination of hardware with firmware and/or software.

At procedure 710 of flow diagram 700, site data identifying the installed components of the computer system and a version of each of the installed components is received. In one embodiment, the site data includes site metadata. In one embodiment, the computer system is a hyper-converged appliance.

At procedure 720, component dependency data identifying at least one component of the installed components requiring installation of another component of the installed components is received. In one embodiment, the site data includes the component dependency data.

At procedure 730, component interoperability data identifying versions of a component of the installed components that are interoperable with versions of another component of the installed components is received. In one embodiment, the component dependency data and the component interoperability data are maintained in a knowledge base repository.

At procedure 740, a version dependency compatibility acyclic graph is generated based at least on the installed components, the component dependency data and component interoperability data. In one embodiment, nodes of the version dependency compatibility acyclic graph represent the installed components, wherein directed edges connecting a pair of nodes identify an ancestor component and a dependent component, the directed edges including at least one version interoperability pair identifying compatible versions of the ancestor component and dependent component. In one embodiment, a version interoperability pair includes a first value representing a version of the ancestor component and a second value representing a version of the dependent component. In one embodiment, the at least one version interoperability pair includes versions of the dependent component that are not less than an installed version of the dependent component.

At procedure 750, it is determined whether the installed components are interoperable based on the version dependency compatibility acyclic graph. With reference to FIG. 7B, in one embodiment, procedure 750 includes optional procedure 752. At procedure 752, it is determined whether pairs of installed components are interoperable, wherein a first installed component of a pair is dependent on a second installed component of the pair. In other embodiments, procedure 750 includes optional procedure 754 and 756. At procedure 754, provided a first plurality of installed components are dependent on a first installed component, it is determined whether each pair of the first plurality of installed components and the first installed component are interoperable. At procedure 756, provided a second plurality of installed components are ancestors to a second installed component, it is determined whether each pair of the second plurality of installed components and the second installed component are interoperable.

With reference to FIG. 7C, in one embodiment, flow diagram 700 proceeds to procedure 760, where the version dependency compatibility acyclic graph is stored in a knowledge base repository.

In one embodiment, as shown at procedure 770, responsive to a change in the installed components of the computer system, the version dependency compatibility acyclic graph is updated to reflect the change.

In one embodiment, as shown at procedure 780, responsive to a determination that the installed components are interoperable, an indication that a current installation of the installed components on the computer system is valid is presented.

In one embodiment, as shown at procedure 790, responsive to a determination that at least two of the installed components are not interoperable, an indication that a current installation of the installed components on the computer system is not valid is presented, where the indication identifies the at least two of the installed components that are not interoperable.

Figure 8B:
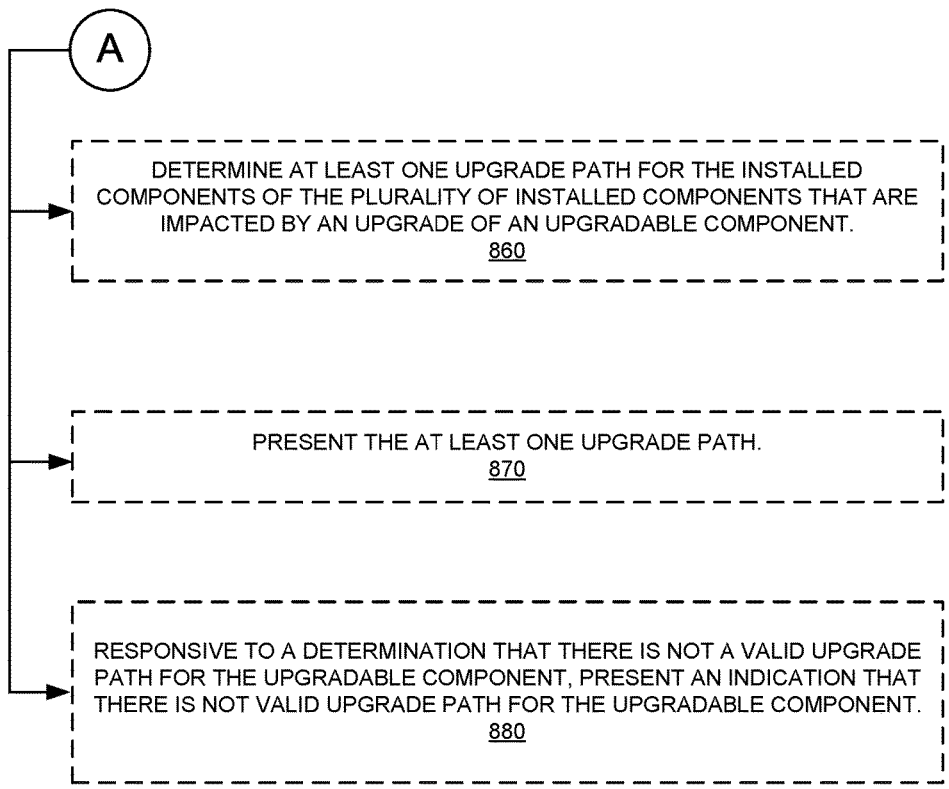

FIGS. 8A-B illustrate flow diagrams 800 of an example method for performing an upgrade analysis of a computer system, according to various embodiments. Procedures of this method may be described with reference to or implemented by elements and/or components of FIGS. 2 through 5. It is appreciated that in some embodiments, the procedures may be performed in a different order than described, that some of the described procedures may not be performed, and/or that one or more additional procedures to those described may be performed. Flow diagram 800 includes some procedures that, in various embodiments, are carried out by one or more processors under the control of computer-readable and computer-executable instructions that are stored on non-transitory computer-readable storage media. It is further appreciated that one or more procedures described in flow diagram 800 may be implemented in hardware, or a combination of hardware with firmware and/or software.

At procedure 810 of flow diagram 800, a version dependency compatibility acyclic graph defining component dependency and component version interoperability for a plurality of installed components of the computer system is received. In one embodiment, the computer system includes a hyper-converged appliance.

In one embodiment, nodes of the version dependency compatibility acyclic graph represent the installed components, wherein edges connecting a pair of nodes identify an ancestor component and a dependent component, the edges including at least one version interoperability pair identifying compatible versions of the ancestor component and dependent component. In one embodiment, a version interoperability pair includes a first value representing a version of the ancestor component and a second value representing a version of the dependent component. In one embodiment, the at least one version interoperability pair includes versions of the dependent component that are not less than an installed version of the dependent component.

At procedure 820, at least one upgradable component of the plurality of installed components is determined based on the version dependency compatibility acyclic graph. In one embodiment, each node and each edge associated with a particular node includes a compatibility version set identifying all distinct versions of an installed component represented by the particular node appearing in all associated version interoperability pairs for the particular node.

In one embodiment, as shown at procedure 822, an installed component having an upgradable version is identified as an intersection set of the compatibility version set for the node representing the installed component other than a current version of the installed component. In one embodiment, as shown at procedure 824, provided the intersection set is not null, it is determined that the installed component is an upgradable component.

At procedure 830, an upgrade analysis request for an upgradable component of the plurality of installed components is received.

At procedure 840, installed components of the plurality of installed components that are impacted by an upgrade of the upgradable component are identified based on the version dependency compatibility acyclic graph. In one embodiment, as shown at procedure 842, the version dependency compatibility acyclic graph starting from the upgradable component to determine impacted installed components is recursively traversed. In one embodiment, as shown at procedure 844, a compatible version set for each of the impacted installed components is identified.

With reference to FIG. 8B, in one embodiment, flow diagram 800 proceeds to procedure 860, where at least one upgrade path for the impacted installed components and the upgradable component is determined. In one embodiment, at procedure 870, the at least one upgrade path is presented. In one embodiment, as shown at procedure 880, responsive to a determination that there is not a valid upgrade path for the upgradable component, an indication that there is not valid upgrade path for the upgradable component is presented.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for performing an upgrade analysis of a computer system, the method comprising:
   accessing a version dependency compatibility acyclic graph defining component dependency and component version interoperability for a plurality of installed components of the computer system;
   determining at least one upgradable component of the plurality of installed components based on the version dependency compatibility acyclic graph, the determining the at least one upgradable component comprising:
      identifying an installed component having an upgradable version as an intersection set of a compatibility version set for a node of the version dependency compatibility acyclic graph representing the installed component other than a current version of the installed component; and
      provided the intersection set is not null, determining the installed component is an upgradable component;
   receiving an upgrade analysis request for an upgradable component of the plurality of installed components;
   identifying installed components of the plurality of installed components that are impacted by an upgrade of the upgradable component based on the version dependency compatibility acyclic graph; and
   determining at least one upgrade path for the installed components of the plurality of installed components that are impacted by an upgrade of an upgradable component; and
   presenting the at least one upgrade path.

2. The computer-implemented method of claim 1, wherein nodes of the version dependency compatibility acyclic graph represent the installed components, wherein edges connecting a pair of nodes identify an ancestor component and a dependent component, the edges comprising at least one version interoperability pair identifying compatible versions of the ancestor component and dependent component.

3. The computer-implemented method of claim 2, wherein a version interoperability pair comprises a first value representing a version of the ancestor component and a second value representing a version of the dependent component.

4. The computer-implemented method of claim 2, wherein the at least one version interoperability pair comprises versions of the dependent component that are not less than an installed version of the dependent component.

5. The computer-implemented method of claim 2, wherein each node and each edge associated with a particular node comprises a compatibility version set identifying all distinct versions of an installed component represented by the particular node appearing in all associated version interoperability pairs for the particular node.

6. The computer-implemented method of claim 1, wherein the identifying installed components of the plurality of installed components that are impacted by an upgrade of the upgradable component based on the version dependency compatibility acyclic graph comprises:
   recursively traversing the version dependency compatibility acyclic graph starting from the upgradable component to determine impacted installed components; and
   identifying a compatible version set for each of the impacted installed components.

7. The computer-implemented method of claim 6 further comprising:
   determining at least one upgrade path for the impacted installed components and the upgradable component.

8. The computer-implemented method of claim 1, further comprising:
   responsive to a determination that there is not a valid upgrade path for the upgradable component, presenting an indication that there is not valid upgrade path for the upgradable component.

9. The computer-implemented method of claim 1, wherein the computer system comprises a hyper-converged appliance.

10. A non-transitory computer readable storage medium having computer readable program code stored thereon for causing a computer system to perform a method for performing an upgrade analysis of a computer system, the method comprising:
    accessing a version dependency compatibility acyclic graph defining component dependency and component version interoperability for a plurality of installed components of the computer system;
    determining at least one upgradable component of the plurality of installed components based on the version dependency compatibility acyclic graph, the determining the at least one upgradable component comprising:
       identifying an installed component having an upgradable version as an intersection set of a compatibility version set for a node of the version dependency compatibility acyclic graph representing the installed component other than a current version of the installed component; and
       provided the intersection set is not null, determining the installed component is an upgradable component;
    receiving an upgrade analysis request for an upgradable component of the plurality of installed components;
    identifying installed components of the plurality of installed components that are impacted by an upgrade of the upgradable component based on the version dependency compatibility acyclic graph;
    determining at least one upgrade path for the installed components of the plurality of installed components that are impacted by an upgrade of the upgradable component; and
    presenting the at least one upgrade path.

11. The non-transitory computer readable storage medium of claim 10, wherein nodes of the version dependency compatibility acyclic graph represent the installed components, wherein edges connecting a pair of nodes identify an ancestor component and a dependent component, the edges comprising at least one version interoperability pair identifying compatible versions of the ancestor component and dependent component.

12. The non-transitory computer readable storage medium of claim 11, wherein a version interoperability pair comprises a first value representing a version of the ancestor component and a second value representing a version of the dependent component.

13. The non-transitory computer readable storage medium of claim 11, wherein the at least one version interoperability pair comprises versions of the dependent component that are not less than an installed version of the dependent component.

14. The non-transitory computer readable storage medium of claim 11, wherein each node and each edge associated with a particular node comprises a compatibility version set identifying all distinct versions of an installed component represented by the particular node appearing in all associated version interoperability pairs for the particular node.

15. The non-transitory computer readable storage medium of claim 10, wherein the identifying installed components of the plurality of installed components that are impacted by an upgrade of the upgradable inctalled component based on the version dependency compatibility acyclic graph comprises:
  recursively traversing the version dependency compatibility acyclic graph starting from the upgradable component to determine impacted installed components; and
  identifying a compatible version set for each of the impacted installed components.

16. A hyper-converged appliance comprising:
  one or more data processors;
  one or more networking components;
  one or more data storage components having computer readable program code stored thereon for causing the one or more data processors to:
    access a version dependency compatibility acyclic graph defining component dependency and component version interoperability for a plurality of installed components of the hyper-converged appliance, wherein nodes of the version dependency compatibility acyclic graph represent the installed components, wherein directed edges connecting a pair of nodes identify an ancestor component and a dependent component, the directed edges comprising at least one version interoperability pair identifying compatible versions of the ancestor component and dependent component, wherein a version interoperability pair comprises a first value representing a version of the ancestor component and a second value representing a version of the dependent component, and wherein the at least one version interoperability pair comprises versions of the dependent component that are not less than an installed version of the dependent component;
    determine upgradable components of the installed components based on the version dependency compatibility acyclic graph by identifying an installed component having an upgradable version as an intersection set of a compatibility version set for a node of the version dependency compatibility acyclic graph representing the installed component other than a current version of the installed component, and provided the intersection set is not null, determining the installed component is an upgradable component;
    receive an upgrade analysis request for an upgradable component of the plurality of installed components;
    identify installed components of the plurality of installed components that are impacted by an upgrade of the upgradable component based on the version dependency compatibility acyclic graph;
    determine at least one upgrade path for the installed components of the plurality of installed components that are impacted by an upgrade of the upgradable component; and
    present the at least one upgrade path.

\* \* \* \* \*